US012018691B2

(12) United States Patent
Schofield et al.

(10) Patent No.: US 12,018,691 B2
(45) Date of Patent: Jun. 25, 2024

(54) VACUUM PUMP

(71) Applicant: Edwards Limited, Burgess Hill (GB)

(72) Inventors: Nigel Paul Schofield, Burgess Hill (GB); Stephen Dowdeswell, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 161 days.

(21) Appl. No.: 17/791,068

(22) PCT Filed: Jan. 7, 2021

(86) PCT No.: PCT/GB2021/050036
§ 371 (c)(1),
(2) Date: Jul. 6, 2022

(87) PCT Pub. No.: WO2021/140330
PCT Pub. Date: Jul. 15, 2021

(65) Prior Publication Data

US 2023/0024392 A1 Jan. 26, 2023

(30) Foreign Application Priority Data

Jan. 9, 2020 (GB) ...................................... 2000298

(51) Int. Cl.
*F04D 19/04* (2006.01)
*F04D 29/54* (2006.01)

(52) U.S. Cl.
CPC ......... *F04D 19/042* (2013.01); *F04D 29/542* (2013.01); *F05D 2260/231* (2013.01); *F05D 2300/121* (2013.01); *F05D 2300/171* (2013.01)

(58) Field of Classification Search
CPC ..... F04D 19/042; F04D 19/044; F04D 29/542
See application file for complete search history.

(56) References Cited

U.S. PATENT DOCUMENTS

| | | | | |
|---|---|---|---|---|
| 4,309,143 | A | 1/1982 | Klatt et al. | |
| 2008/0118351 | A1* | 5/2008 | Akimoto | F04D 19/042 415/191 |
| 2015/0037137 | A1 | 2/2015 | Schofield et al. | |

FOREIGN PATENT DOCUMENTS

| | | | | |
|---|---|---|---|---|
| EP | 2620649 | A1 | 7/2013 | |
| EP | 3521629 | A1 * | 8/2019 | F04D 19/04 |

(Continued)

OTHER PUBLICATIONS

British Examination Report dated Jun. 26, 2020 and Search Report dated Jun. 25, 2020 for corresponding British Application No. GB2000297.8, 6 pages.

(Continued)

*Primary Examiner* — Kenneth J Hansen
(74) *Attorney, Agent, or Firm* — Theodore M. Magee; Westman, Champlin & Koehler, P.A.

(57) ABSTRACT

A vacuum pump comprising: a rotor rotatably mounted within a stator; the rotor comprising a plurality of angled blades arranged along a helical path from an inlet to an outlet; the stator comprising a plurality of perforated elements forming a plurality of perforated discs arranged to intersect the helical path at different axial positions, the perforations allowing gas molecules travelling along the helical path to pass through the perforated elements. Each of the perforated discs comprises an outer curved wall forming an outer circumference of the disc and an inner curved wall forming a portion of an inner circumference of the disc, the inner circumference comprising at least one gap where there is no inner wall.

14 Claims, 5 Drawing Sheets

(56) References Cited

FOREIGN PATENT DOCUMENTS

| | | | |
|---|---|---|---|
| EP | 3521629 | A1 | 8/2019 |
| EP | 3530951 | A1 | 8/2019 |
| GB | 2498768 | A | 7/2013 |
| JP | S62173594 | U | 11/1987 |
| JP | 2015505012 | A | 2/2015 |
| WO | 2021140329 | A1 | 7/2021 |

OTHER PUBLICATIONS

PCT Notification of Transmittal of the International Preliminary Report on Patentability dated Mar. 23, 2021, International Search Report and Written Opinion dated Mar. 23, 2021 for corresponding PCT application Serial No. PCT/GB2021/050035, 12 pages.

British Examination Report dated Jun. 26, 2020 and Search Report dated Jun. 25, 2020 for corresponding British Application No. GB2000298.6, 5 pages.

PCT Notification of Transmittal of the International Preliminary Report on Patentability dated Mar. 19, 2021, International Search Report and Written Opinion dated Mar. 19, 2021 for corresponding PCT application Serial No. PCT/GB2021/050036, 12 pages.

* cited by examiner

VACUUM PUMP

CROSS-REFERENCE TO RELATED APPLICATION

This application is a Section 371 National Stage Application of International Application No. PCT/GB2021/050036, filed Jan. 7, 2021, and published as WO 2021/140330A1 on Jul. 15, 2021, the content of which is hereby incorporated by reference in its entirety and which claims priority of British Application No. 2000298.6, filed Jan. 9, 2020.

FIELD

The field of the invention relates to a vacuum pump.

BACKGROUND

Vacuum pumps are designed and configured to operate effectively across a particular pressure range. No one pump can operate effectively across all pressure ranges.

At high vacuums in the molecular flow regime turbomolecular pumps are effective, while at lower vacuums in the viscous flow regime rough pumps such as roots-blower pumps are effective. In the transitional flow regime at pressures where both molecular and viscous flow occur drag pumps may be used.

The pumping mechanism of a conventional drag pumps requires the rotor to rotate close to the stator in order to optimise the compression ratio of the pump and this limits the depth of the stator channel, which in turn limits the pumping capacity of a conventional drag pump.

There is an increasing requirement to operate semiconductor chambers over a range of pressures that can be too high for a turbo pump to sustain without overheating, (typically pressures above 0.05 mbar), but are too low for a remotely mounted roots blower to be effective due to the conductance of the connection pipe. (typically less than 0.2 mbar).

It would be desirable to provide a pump that had a reasonable capacity and was effective at pumping at pressures conventionally pumped by drag pumps.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a vacuum pump comprising: a rotor rotatably mounted within a stator; said rotor comprising a plurality of angled blades arranged along a helical path from an inlet to an outlet; said stator comprising a plurality of perforated elements forming a plurality of perforated discs arranged to intersect said helical path at different axial positions, said perforations allowing gas molecules travelling along said helical path to pass through said perforated elements; wherein each of said perforated discs comprises an outer curved wall forming an outer circumference of said disc and an inner curved wall forming a portion of an inner circumference of said disc, said inner circumference comprising at least one gap where there is no inner wall.

A conventional drag pump suffers from having a relatively low volumetric speed due to the narrow passages that must be used. The Schofield drag pump described in patent US 2015/0037137 mitigates this speed limitation by passing gas through one of the drag surfaces and thereby enables a much higher capacity machine to be designed.

The current application provides an adaptation of the Schofield pump. In particular, the drag surfaces are provided as perforated discs intersecting the helical path provided by the angled blades of the rotor. One of the challenges of this arrangement is that in order for there not to be undue leakage of gas in the reverse pumping direction the clearances between the perforated discs and rotor and indeed between adjacent rows of rotor blades should be relatively low. This limits both the thickness of the perforated discs and also the amount that they can distort axially without clashing with the rotating rotor. Providing thin discs where distortion is limited can be challenging and this is particularly so within a pump where temperatures will increase during operation and providing effective cooling is challenging due to the low pressure environment.

The interior of a pump is particularly challenging to cool and this can lead to differential heating of the perforated discs which extend into the pump with the internal part heating up to a higher level than the external part which is attached to the external wall of the stator. This can result in distortions of the perforated disc and in particular of the inner wall of the perforated disc which given the low clearances required can lead to clashes with the rotor which can be catastrophic.

Embodiments have addressed this issue by forming the inner circumferential curved wall of the perforated disc with at least one gap within the inner wall such that when the inner wall expands due to heating during operation there is space for it to expand circumferentially into the gap and this avoids or at least reduces any axial expansion.

In some embodiments, each of said perforated discs comprises at least two perforated elements, said inner circumference comprising at least two gaps, said at least two gaps in said inner circumference being between adjacent perforated elements forming said perforated disc.

Forming the perforated disc of two perforated elements allows it to be more easily mounted around the rotor shaft and between the rotor elements of the different stages. Where the perforated disc is formed of multiple elements then the gaps in the inner circumference may be conveniently located between the adjacent elements.

In some embodiments, said perforated elements are configured to be mounted such that there is substantially no gap between adjacent outer curved walls.

The outer circumference of the perforated elements are attached to the outer cylindrical wall of the stator and there is no requirement for a gap as generally the cylindrical wall and the outer portion of the stator elements will be at substantially the same temperature and expand by substantially the same amount and thus, forming the outer circumferential walls with no gap can be advantageous in reducing the number of surfaces with which the rotor may clash.

In some embodiments, said perforated elements further comprise side walls extending between said inner curved wall and said outer curved wall at either end of said perforated elements.

The perforated elements may comprise an outer frame of inner, outer and side walls, which walls are generally thicker than any intermediate walls and provide the majority of the mechanical strength of the discs.

In some embodiments, said perforated elements further comprise a plurality of partitions extending from said outer curved wall to said inner curved wall, perforations being formed between said plurality of partitions.

There may be partitions extending from the inner to the outer wall, the perforations being formed between the plurality of partitions. Arranging partitions that run between the inner and outer wall helps improve thermal conduction between the two, reducing the differential thermal expansion of the two elements.

In some embodiments, there may be strengthening walls that run substantially midway between the inner and outer walls and parallel to them linking the partitions and dividing the perforations.

In some embodiments, said inner curved wall of each of said plurality of perforated elements comprises at least one indent extending from said inner curved wall towards said outer curved wall, said at least one indent comprising said one of said at least one gap in said inner circumference.

Additionally and/or alternatively the at least one gap may be formed by an indent in the inner curved wall wherein the inner curved wall curves away from the inner circumference towards the outer curved wall. In some embodiments, the indent extends substantially to the outer curved wall, in some cases to within 20% of the width of the element.

In some embodiments, a width of a wall surrounding said indent and a width of said inner and said outer curved walls are substantially wider than a width of said partitions.

The width of the partitions is generally substantially less than the inner and outer and indeed the side walls of the perforated element as these provide a frame which gives mechanical stability to the mechanical element and inhibits its distortion. The inner partition elements run from the inner to the outer element to provide a thermally conducting path between these elements and help cool the inner element and reduce thermal expansion and possible distortion.

In some embodiments, said walls of said at least one indent are angled such that when rotating a radius of said rotor crosses a radially outer portion of said wall before a radially inner portion of said wall.

As noted previously, a potential problem with such a pump is possible clashes between the rotor and the stator. This is exasperated by the requirement for low clearances between the rotor and stator elements and the fact that the rotor may be mounted on magnetically levitated bearings which have some axial instability. In order to protect the rotor from clashing with a protrusion extending into its pathway, it may be advantageous for the indents to be angled such that when rotating the rotor crosses a radial outer portion of the wall before the radially inner portion. Thus, the edge of the rotor will be running along the outer wall and will meet this portion of the partition before it meets the indent and thus, where there is axial distortion due to expansion of the inner wall, the rotor will meet the outer portion that has little axial movement first and will push axially against the perforated element as it progresses along the wall and this should inhibit it clashing with a portion of the indent walls that may have distorted into its pathway.

In some embodiments, said side wall of said perforated element that said rotor crosses first when rotating is angled such that such that said radius of said rotor crosses a radially outer portion of said side wall before said rotor crosses a radially inner portion of said wall.

A further and perhaps more hazardous potential clashing point is the side walls of the perforated elements. Thus, in embodiments the side wall is angled such that the front of a rotor blade will meet the outer curved wall at or close to the outer circumference before the rest of the rotor meets the rest of the edge of that partition. This should inhibit the edge of the partition and the rotor clashing.

In this regard, it is advantageous if the outer walls do not have a gap between them such that the rotor which meets the outer wall first does not see a gap where it might hit a side wall.

In some embodiments, said side wall of said perforated element that said rotor crosses last when rotating comprises a protrusion extending circumferentially beyond said side wall.

In order for there to be a gap between the different elements forming the perforated disc at the inner surface and not at the outer surface, there may conveniently be a protrusion extending from the outer wall which meets with the outer wall of the adjacent element.

In some embodiments, said stator further comprises a cylindrical surface formed by a stack of rings each having a cylindrical inner surface, said plurality of perforated elements being mounted on respective rings, such that said plurality of perforated elements form a plurality of perforated discs intersecting said helical path at different axial positions.

The helical channel may be within a cylindrical surface with the rotor rotating within this surface. The cylindrical surface may be formed of a stack of rings between which the perforated discs of the stator may be mounted at different axial positions. Thus, the helical path is intercepted at different axial positions by the perforated discs as the gas flows through the pump. The axis concerned here is the axis of rotation of the rotor.

In some embodiments, said perforated elements are formed of aluminium.

Aluminium has a high thermal conductivity and as such is relatively light and is mechanically quite strong and thus, it may be a convenient material for forming the perforated elements where thermal conductivity is important.

In some embodiments, said rotor is formed of stainless steel.

Stainless steel can operate at higher temperatures than aluminium and the rotor will rise to higher temperatures than the stator. This may be advantageous not only allowing the pump to operate at higher temperatures but also enabling it to operate at temperatures where deposition of particles from a semiconductor chamber are less likely to occur.

In some embodiments, said perforated elements located towards an inlet of said vacuum pump comprise a transparency of more than 40% and said perforated elements located towards an outlet of said vacuum pump comprise a transparency of more than 30%.

Transparency is the ratio of the total area of the perforations of the perforated element intersecting a gas flow channel to the total area of the element intersecting the gas flow path channel.

Providing a pump that is able to pump in the pressure range of a conventional drag pump, but that also has a high transparency enables the pump to effectively pump at a relatively high pumping speed at the lower pressures, while at the higher pressures, the transparency of the pump allows effective pumping when the pump is backed by another pump such as a roots blower and primary pump combination. The transparency of the vacuum pump does reduce compression particularly at the higher pressures, but this is acceptable as at these pressures a backing pump, even when connected from a remote location, can pump effectively, provided that the transparency of any pump between the backing pump and the chamber is not so high that it unduly impedes the flow.

As the gas flows through the pump it is compressed and this compression means that the open or transparent area can be reduced towards the outlet.

In some embodiments, said perforated elements located towards an inlet of said vacuum pump comprise a transparency of more than 50% and said perforated elements located towards an outlet of said vacuum pump comprise a transparency of more than 40%.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Embodiments provide an adapted Schofield pump having a rotor with a plurality of angled blades arranged along a helical path. The stator comprises a plurality of perforated discs arranged to intersect the helical path at different axial positions and through which the gas passes on its way from the inlet to outlet. The pump is suitable for pumping in the pressure region of 1 mbar and $5\times10^{-2}$ mbar and provides a pumping capacity in the region of 600 l/s. In embodiments the rotor is mounted on magnetically levitated bearings and this makes it suitable for locating in a clean room and for evacuating a semiconductor processing chamber, in particular, when backed by a roots blower and primary pump combination which may be located in the basement.

However, passing the gas through perforated stator elements presents its own challenges due to the low axial clearance gaps between the perforated elements and the rotor. Embodiments, seek to address these challenges by designing the stator to provide spaces in the inner circumference such that differential expansion of the inner portion relative to the outer portion can generally be accommodated within the spaces reducing the chances of the expansion leading to axial movement of the element which in turn can lead to clashes between the rotor and stator.

Figure 1:
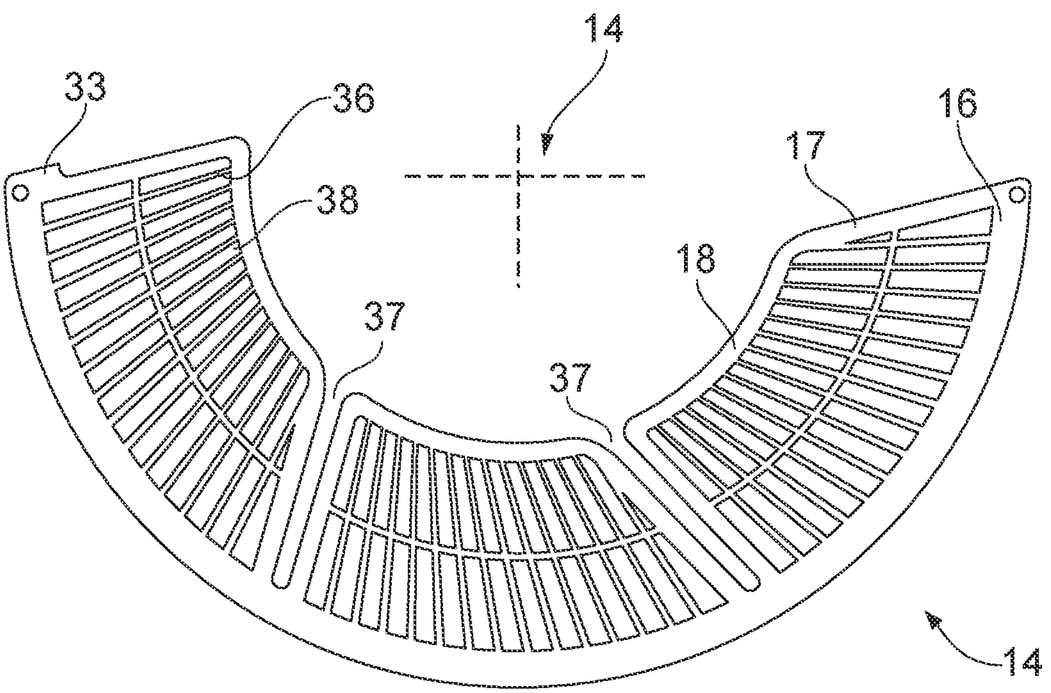
FIG. 1 shows a perforated stator element according to an embodiment.

FIG. 1 shows a perforated element 14, that forms a portion of perforated stator disc. In this embodiment the perforated stator disc, is formed in two sections, which comprise the two elements 14, which are joined together (sloping side wall to side wall with protrusion) to form a complete disc. The perforated stator disc has a transparency of more than 30% and each element 14 comprises an inner circumferential wall 18, an outer circumferential wall 16 and side walls 17 which form a frame providing mechanical stability to the perforated element 14.

In this embodiment, there are radially extending partitions 36 running between the inner 18 and outer 16 walls and between which are formed perforations 38. These radially extending partitions conduct heat from the inner walls forming the central portion of the disc to the outer walls forming the outer portion, thereby reducing the heat increase of the central ring of the disc.

Indents 37 are provided in the inner wall 18 forming the inner ring of the disc and these provide space for the inner ring to expand into thereby reducing the chances that expansion will cause buckling of the ring with the associated axial movement which can cause clashing between the rotor and stator.

Figure 5:
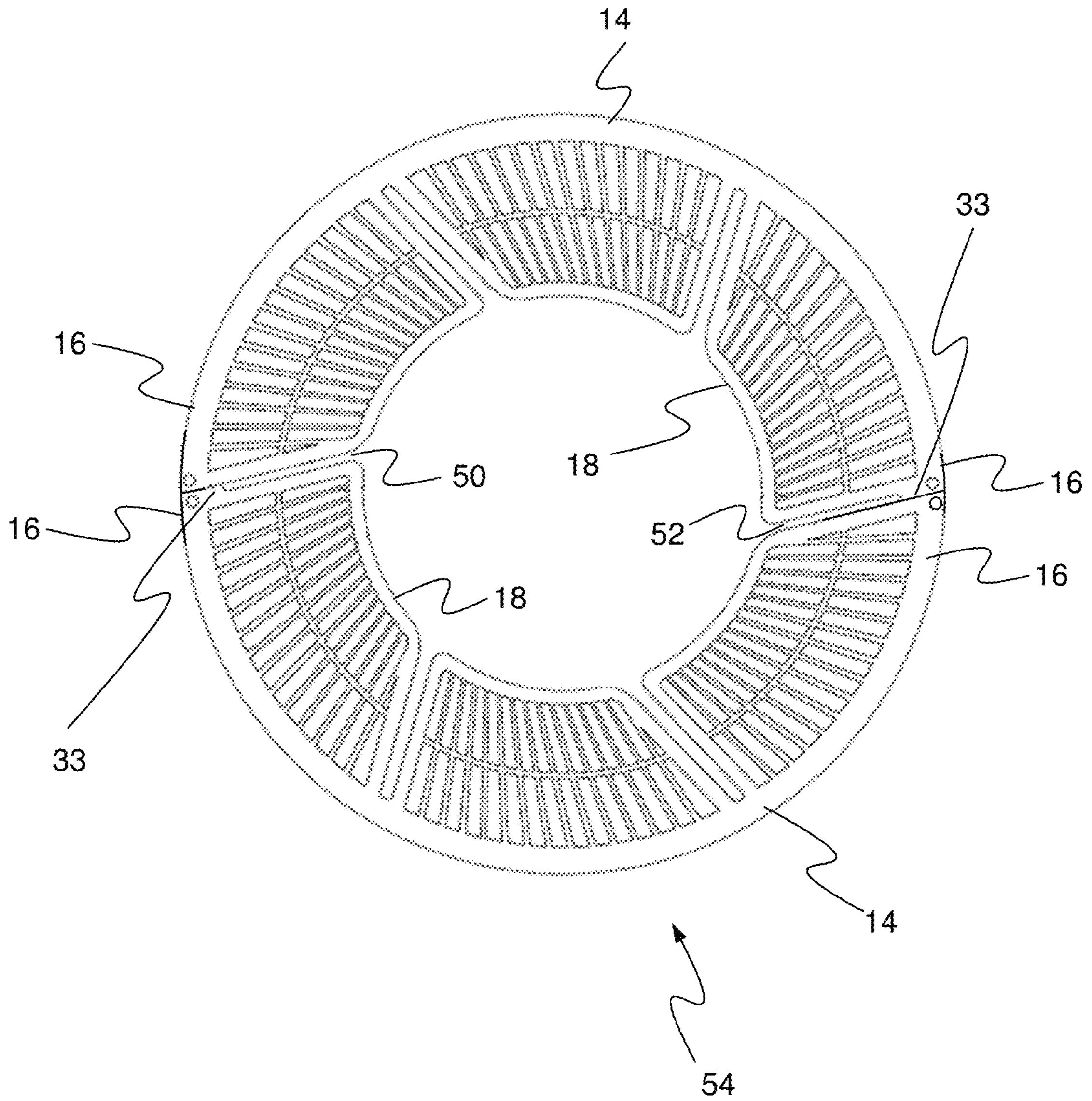
FIG. 5 shows two perforated stator elements positioned to form a stator disc.

The perforated element 14 is configured so that one side wall 17 comprises a protrusion 33 that extends circumferentially beyond the side wall. As shown in FIG. 5, when two perforated elements 14 are mounted together to form a disc 54, the protrusions 33 on perforated elements 14 create respective gaps 50 and 52 in inner wall 18 while there is substantially no gap between outer walls 16 of the perforated elements. This gap also provides space for circumferential expansion of the inner wall thereby reducing the chances that the inner wall will buckle on heating and move axially when expanding due to an increase in temperature.

The perforated element is also configured so that the side walls 17 and indents 37 are sloped away from the oncoming rotor, so that the rotor will cross the junction between elements 14 and the walls of the indents 37 at a radially outer portion. This means that were there to be some axial movement of the inner ring at these gaps, the rotor will meet the radially outer portion of the side wall of the indent or element 14 first and slide along this, pushing against any axial movement and reducing the chances of a catastrophic clash where the perforated element 14 would be damaged.

Figure 2:
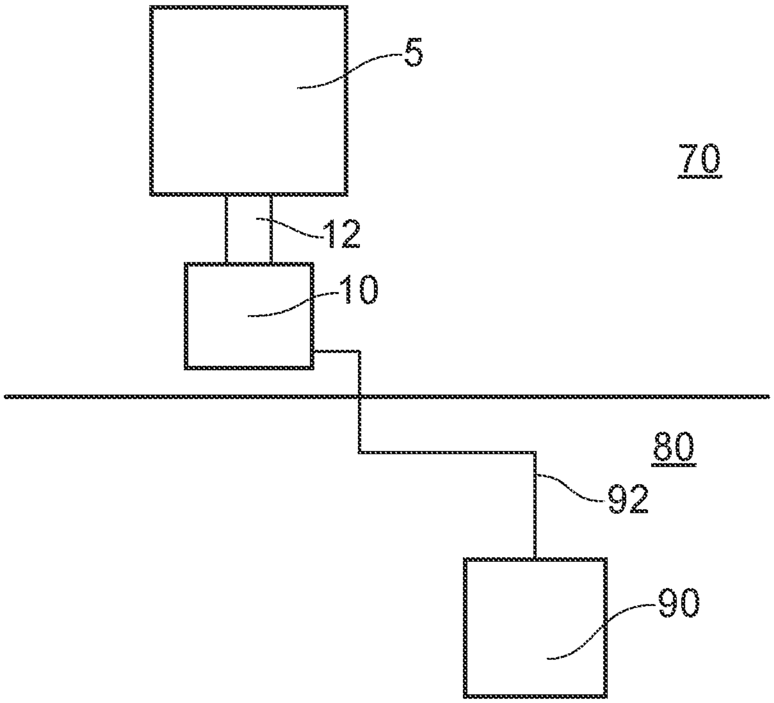
FIG. 2 shows a semiconductor chamber and a set of pumps for evacuating the semiconductor chamber according to an embodiment.

FIG. 2 shows a semiconductor chamber 5 located within a clean room or semiconductor fab 70 and with a Schofield vacuum pump 10 according to an embodiment attached to the semiconductor chamber. The vacuum pump 10 has magnetically levitated bearings and as such can be mounted in the clean room 70 and can be attached to the vacuum chamber 5 by a relatively short conduit 12.

Remote from the vacuum pump 10 and semiconductor chamber 5 is a backing pump combination 90 which comprises a roots blower and a primary pump. These are located in the basement 80. For this reason the conduit 92 between the backing pump combination 90 and the Schofield pump 10 is relatively long and this affects the effectiveness of the backing pump 90 particularly at low pressures.

The combination of the Schofield pump 10 with relatively high pumping capacity attached close to the semiconductor chamber 5 and with the backing pumps 90 which can pump effectively at the higher pressures of the effective pumping range provide a set of pumps which pump effectively in the pressure range of a conventional drag pump but with increased pumping capacity.

Figure 3:
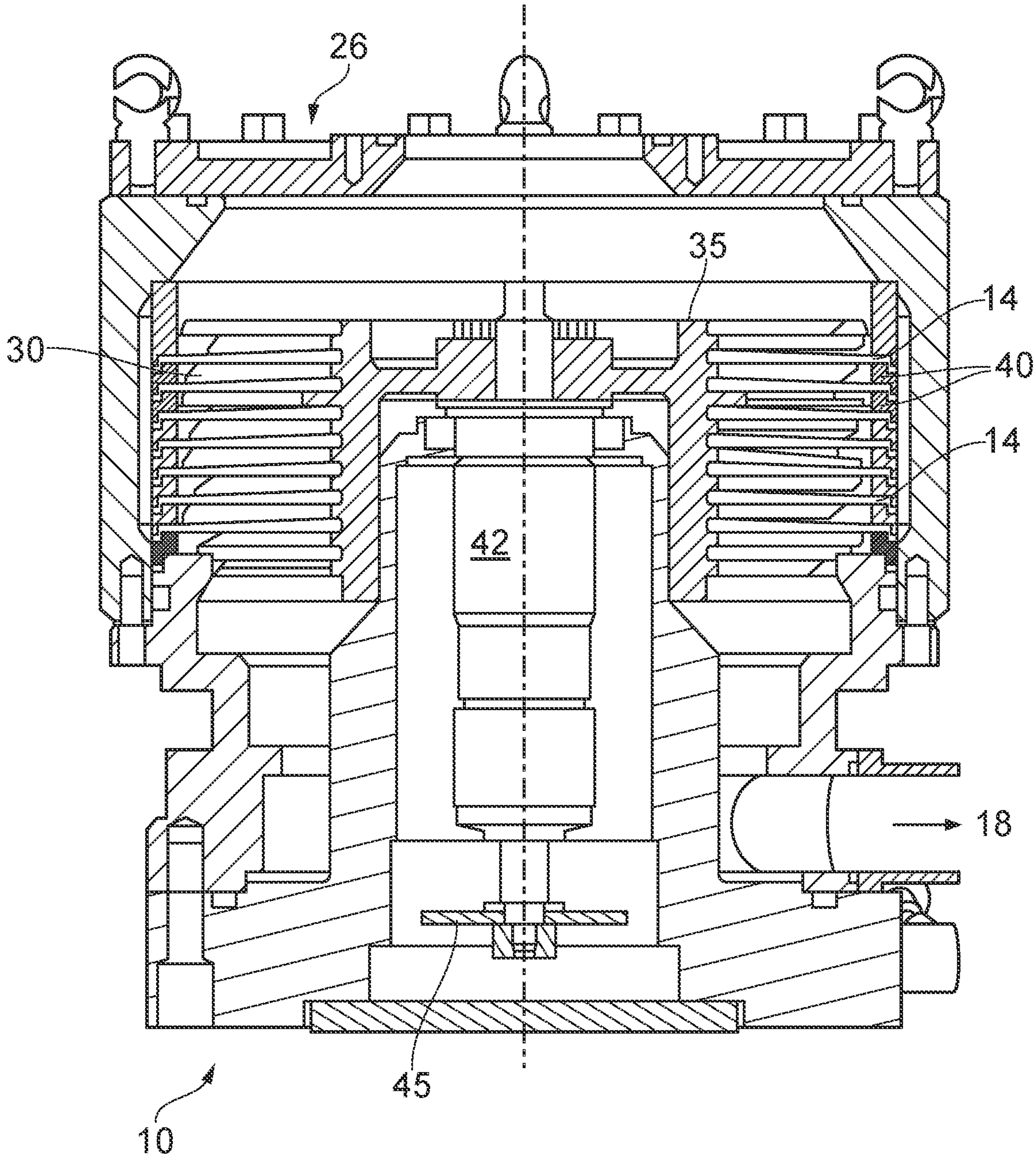
FIG. 3 shows a vacuum pump of a pump according to an embodiment.

The Schofield vacuum pump 10 is shown schematically in FIG. 3. Vacuum pump 10 comprises a plurality of perforated stator elements 14 (as shown in FIG. 1) which are mounted together to form perforated discs through which the gas flows from an inlet 26 to an exhaust 28. The perforated discs are mounted at different axial positions on cylindrical rings 40 and extend between rows of blades 30 of rotor 35 which blades 30 form a helical path from the inlet 26 to the outlet 28. The helical rotor 35 is mounted on shaft 42 and rotates during operation. Shaft 42 is mounted on magnetically levitated bearings 45.

Figure 4:
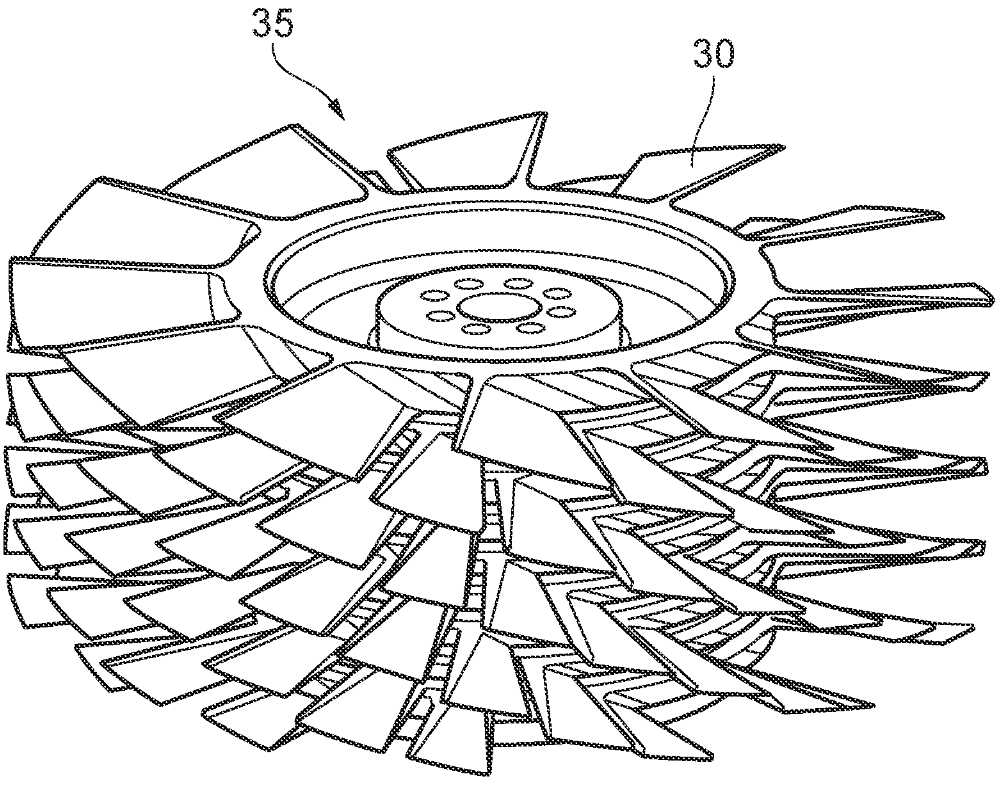
FIG. 4 shows a rotor for a vacuum pump according to an embodiment.

FIG. 4 shows a view of rotor 35 of vacuum pump 10 and shows the helical path formed by rotor blades 30. Rotation of rotor 35 imparts momentum to gas molecules that the blades contact, and sends them towards the outlet 18 through the perforated elements 14. Impact with the non-perforated portions of the stator disks slows the gas molecules and provides the drag of the drag pump, pulling the molecule trajectory towards the output.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:

a rotor rotatably mounted within a stator;

said rotor comprising a plurality of angled blades arranged along a helical path from an inlet to an outlet;

said stator comprising a plurality of perforated elements comprising perforations, the plurality of perforated elements forming a plurality of perforated discs arranged to intersect said helical path at different axial positions, said perforations allowing gas molecules travelling along said helical path to pass through said perforated elements; wherein each of said perforated discs comprises an outer curved wall forming an outer circumference of said disc and an inner curved wall forming a portion of an inner circumference of said disc, said inner circumference comprising a plurality of gaps where there is no inner wall wherein said inner curved wall of each of said plurality of perforated elements comprises at least one indent extending from said inner curved wall towards said outer curved wall, said at least one indent comprising one of said plurality of gaps in said inner circumference.

2. The vacuum pump according to claim 1, wherein each of said perforated discs comprises at least two perforated elements, and said plurality of gaps comprises two gaps in said inner circumference between adjacent perforated elements forming said perforated disc.

3. The vacuum pump according to claim 1, wherein said perforated elements are configured to be mounted such that there is substantially no gap between adjacent outer curved walls.

4. The vacuum pump according to claim 1, wherein said perforated elements further comprise side walls extending between said inner curved wall and said outer curved wall at either end of said perforated elements.

5. The vacuum pump according to claim 1, wherein said perforated elements further comprise a plurality of partitions extending from said outer curved wall to said inner curved wall, perforations being formed between said plurality of partitions.

6. The vacuum pump according to claim 1, wherein each at least one indent extends substantially to said outer curved wall.

7. The vacuum pump according to claim 5, wherein a width of a wall surrounding said indent and a width of said inner and said outer curved walls are substantially wider than a width of said partitions.

8. The vacuum pump according to claim 1, wherein each at least one indent is defined in part by a wall having a radially outer portion and a radially inner portion and being angled such that when rotating, said rotor crosses the radially outer portion of the wall before the radially inner portion of the wall.

9. The vacuum pump according to claim 4, wherein said side wall of said perforated element that said rotor crosses first when rotating is angled such that said rotor crosses a radially outer portion of said side wall before said rotor crosses a radially inner portion of said side wall.

10. The vacuum pump according to claim 4, wherein said side wall of said perforated element that said rotor crosses last when rotating comprises a protrusion extending therefrom, said protrusion extending circumferentially beyond said side wall.

11. The vacuum pump according to claim 1, said stator further comprising a cylindrical inner surface formed by a stack of rings each having a cylindrical inner surface, said plurality of perforated elements being mounted on respective rings, such that said plurality of perforated elements form the plurality of perforated discs intersecting said helical path at different axial positions.

12. The vacuum pump according to claim 1, wherein said perforated elements are formed of aluminium.

13. The vacuum pump according to claim 1, wherein said rotor is formed of stainless steel.

14. The vacuum pump according to claim 1, wherein said perforated elements located towards an inlet of said vacuum pump comprise a transparency of more than 50% and said perforated elements located towards an outlet of said vacuum pump comprise a transparency of more than 40%.

* * * * *